(12) United States Patent
Miyashita (10) Patent No.: US 8,872,101 B2
(45) Date of Patent: Oct. 28, 2014

(54) ELECTROOPTIC MODULE AND ELECTRONIC DEVICE HAVING A COVER PARTITIONING A FIRST VENTILATION PATH WHICH EXTENDS ALONG AN EXTENDING DIRECTION OF THE FIRST SIDE END SURFACE OF A TRANSLUCENT PLATE

(71) Applicant: Seiko Epson Corporation, Tokyo (JP)

(72) Inventor: Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 213 days.

(21) Appl. No.: 13/668,505

(22) Filed: Nov. 5, 2012

(65) Prior Publication Data

US 2013/0114046 A1 May 9, 2013

(30) Foreign Application Priority Data

Nov. 9, 2011 (JP) ................................ 2011-245221

(51) Int. Cl.
*H01J 5/02* (2006.01)
*G02F 1/1333* (2006.01)
*G03B 21/16* (2006.01)
*H04N 9/31* (2006.01)

(52) U.S. Cl.
CPC ...... *G02F 1/133308* (2013.01); *G02F 2201/36* (2013.01); *G03B 21/16* (2013.01); *H04N 9/3144* (2013.01)
USPC ....................................... 250/239; 250/208.1

(58) Field of Classification Search
USPC ........... 250/239, 208.1, 216; 353/119, 52, 61, 353/74, 79; 345/7, 8; 359/13, 630; 349/58, 349/66, 161
See application file for complete search history.

(56) References Cited

U.S. PATENT DOCUMENTS 4,963,001 A * 10/1990 Miyajima ........................ 349/5
7,218,373 B2    5/2007 Kojima et al.

FOREIGN PATENT DOCUMENTS

JP    2004-325575 A   11/2004
JP    2011-28089 A     2/2011

* cited by examiner

*Primary Examiner* — Que T Le
(74) *Attorney, Agent, or Firm* — ALG Intellectual Property, LLC (57) ABSTRACT

A small-sized first translucent plate overlapped on an image display region and a plate-like cover are provided on a first substrate. Engagement plate portions of the plate-like cover are engaged with a frame so that the plate-like cover is bonded to the frame. The plate-like cover constitutes a ventilation path which extends along an extending direction of a side end surface of the first substrate and is opened at both sides of the extending direction together with a side end surface of the first translucent plate, an exposed portion of an electrooptic panel from the first translucent plate, and the frame.

9 Claims, 8 Drawing Sheets

ELECTROOPTIC MODULE AND ELECTRONIC DEVICE HAVING A COVER PARTITIONING A FIRST VENTILATION PATH WHICH EXTENDS ALONG AN EXTENDING DIRECTION OF THE FIRST SIDE END SURFACE OF A TRANSLUCENT PLATE

BACKGROUND

1. Technical Field

The present invention relates to an electrooptic module which is used for an electronic device such as a projection-type display apparatus, and an electronic device including the electrooptic module.

2. Related Art

When an image is displayed on an electronic device such as a projection-type display apparatus, light modulated by an electrooptic panel such as a liquid crystal panel is used. The electrooptic panel has a configuration in which an electrooptic material layer such as a liquid crystal layer is provided between a translucent first substrate and a translucent second substrate, for example. The electrooptic panel is used in a state of being supported by a frame or the like. If source light is supplied to the liquid crystal panel (electrooptic panel), heat is generated on the liquid crystal panel (electrooptic panel). Due to this, characteristics of the liquid crystal layer are lowered and display quality is lowered.

In order to solve the problem, on the electrooptic apparatus having a configuration in which the liquid crystal panel is sandwiched between a plate and a cover, the following configuration has been proposed (see, JPA-2004-325575). That is, the cover at the side at which the liquid crystal panel is arranged is hollowed out so as to form a cooling air conducting portion and the liquid crystal panel is cooled with cooling air passing through the cooling air conducting portion.

However, when the cover at the side at which the liquid crystal panel is arranged is hollowed out so as to form the cooling air conducting portion as in the configuration as described in JP-A-2004-325575, there arises a problem in that great effort is necessary to manufacture the cover, resulting in the part being expensive. Furthermore, even if the cover at the side at which the liquid crystal panel is arranged is hollowed out so as to form the cooling air conducting portion, the side end surface of the liquid crystal panel faces the cooling air conducting portion only. Therefore, there is a problem that a cooling effect is low.

SUMMARY

An advantage of some aspects of the invention is to provide an electrooptic module that can realize a ventilation path which is capable of releasing heat generated on an electrooptic panel efficiently with a simple configuration, and an electronic device including the electrooptic module.

An electrooptic module according to an aspect of the invention includes an electrooptic panel that includes an image display region, a frame that supports the electrooptic panel at one surface side of the electrooptic panel, a translucent plate that is overlapped on the image display region at the other surface side of the electrooptic panel and has an end portion located between a first side end surface of the electrooptic panel and the image display region when seen the above, and a plate-like cover that includes a frame-like plate portion which is not overlapped on the image display region and is overlapped on a surface of the translucent plate at a side opposite to the electrooptic panel, and a pair of engagement plate portions which extend toward the frame from a side of the frame-like plate portion and are engaged with the frame, and partitions a first ventilation path which extends along an extending direction of the first side end surface and is opened at both sides of the extending direction together with a side end surface of the translucent plate, a portion on which the electrooptic panel is exposed from the translucent plate at a side of the first side end surface, and the frame.

In the aspect of the invention, as the "translucent plate", it is sufficient that a region which is overlapped on at least the image display region when seen from the above is translucent and that a region which is overlapped on a region other than the image display region may be translucent or may not be translucent.

In the aspect of the invention, the translucent plate is provided on the electrooptic panel so as to be overlapped on the image display region. Therefore, dusts and the like do not adhere to the electrooptic panel directly. Further, the end portion of the translucent plate is located between the first side end surface of the electrooptic panel and the image display region. Therefore, the electrooptic panel at the side at which the first side end surface is located is exposed from the translucent plate. In addition, the plate-like cover including the frame-like plate portion which is overlapped on the surface of the translucent plate at the side opposite to the electrooptic panel is provided at the other surface side of the electrooptic panel. The engagement plate portions of the plate-like cover are engaged with the frame so as to be bonded to the frame. In this state, the plate-like cover constitutes the first ventilation path which extends along the extending direction of the first side end surface and is opened at both sides of the extending direction together with the side end surface of the translucent plate, the portion on which the electrooptic panel is exposed from the translucent plate at the side of the first side end surface, and the frame. Therefore, when the cooling air supplied to the electrooptic module passes through the first ventilation path in the electrooptic module, the cooling air receives heat generated on the electrooptic panel and releases the heat to the outside of the electrooptic module. One surface side of the electrooptic panel at the side at which the first side end surface is located is exposed from the translucent plate and the exposed portion also constitutes the first ventilation path. Therefore, the cooling effect by the cooling air passing through the first ventilation path is high. Further, when the first ventilation path is configured, the size of the translucent plate is made smaller such that the other surface side of the electrooptic panel is exposed partially and the plate-like cover obtained by processing a plate material into a predetermined shape is used. Therefore, the electrooptic panel can be cooled efficiently with a relatively simple configuration.

In the electrooptic module according to the aspect of the invention, it is preferable that an end portion of the translucent plate be located between a second side end surface of the electrooptic panel, which is opposed to the first side end surface when seen from the above, and the image display region, and the plate-like cover partition a second ventilation path which extends along an extending direction of the second side end surface and is opened at both sides of the extending direction together with a side end surface of the translucent plate, a portion on which the electrooptic panel is exposed from the translucent plate at a side of the second side end surface, and the frame. With the configuration, the heat of the electrooptic module can be released efficiently with the cooling air passing through the second ventilation path. When the first ventilation path and the second ventilation path are configured, it is sufficient that the size of the translucent plate is made smaller such that the other surface side of the electrooptic panel is exposed partially and the plate-like cover obtained by processing a plate material into a predetermined shape is used only. Therefore, the electrooptic panel can be cooled efficiently with a relatively simple configuration.

In the electrooptic module according to the aspect of the invention, it is preferable that the frame-like plate portion constitute a defining portion with respect to the image display region. With the configuration, there is an advantage that a defining member is not required to be provided separately.

In the electrooptic module according to the aspect of the invention, it is preferable that the plate-like cover be made of a metal. With the configuration, the heat generated on the electrooptic panel can be released through the plate-like cover. Accordingly, increase in the temperature of the electrooptic panel can be suppressed to be low.

In the electrooptic module according to the aspect of the invention, it is preferable that the translucent plate have a size smaller than the electrooptic panel, and the end portion of the translucent plate be arranged between the electrooptic panel and the image display region on the entire circumference of the translucent plate when seen from the above. With the configuration, the electrooptic panel is exposed on the entire circumference of the translucent plate. Therefore, an area on which the electrooptic panel is exposed from the translucent plate is large. Accordingly, when the cooling air supplied to the electrooptic module flows in the first ventilation path and the second ventilation path, and when the cooling air flows out of the first ventilation path and the second ventilation path, the electrooptic panel at the side at which the first ventilation path and the second ventilation path are not formed is also cooled efficiently with the cooling air.

In the electrooptic module according to the aspect of the invention, it is preferable that the pair of engagement plate portions be provided at the sides at which the first side end surface and the second side end surface are provided, and the frame include plate-like protrusions which protrude to the other surface side and extend in the extending directions at the sides at which the pair of engagement plate portions are located. With the configuration, even when the engagement plate portions are provided at the sides at which the pair of side end surfaces are provided (at the sides at which the ventilation paths are provided), the ventilation paths can be partitioned with the plate-like protrusions of the frame. Accordingly, the cooling air can be prevented from being leaked from the ventilation paths without providing the engagement plate portions entirely in the extending directions of the ventilation paths. This makes it possible to prevent lowering of the cooling effect due to leakage of the cooling air.

In the electrooptic module according to the aspect of the invention, it is preferable that the frame include columnar portions having rectangular cylindrical shapes of which corner portions at the sides at which the first ventilation path and the second ventilation path are opened are curved surfaces or columnar portions having circular cylindrical shapes on an extended line of the first ventilation path and on an extended line of the second ventilation path. With the configuration, even when the columnar portions are present on the extended lines of the ventilation paths, the cooling air flows along the curved surfaces of the columnar portions smoothly. Therefore, the cooling air flows in the ventilation paths and the cooling air flows out of the ventilation paths smoothly. Accordingly, the cooling effect can be prevented from being lowered with the columnar portions present on the extended lines of the ventilation paths.

In the electrooptic module according to the aspect of the invention, it is preferable that the frame include columnar portions which are located at positions deviated from an extended line of the first ventilation path and an extended line of the second ventilation path. With the configuration, even when the columnar portions are provided on the frame, when the cooling air flows in the ventilation paths and the cooling air flows out of the ventilation paths, flow spread of the cooling air can be prevented from being lowered with the columnar portions.

The electrooptic module according to the aspect of the invention can be used for various types of electronic devices. When a projection-type display apparatus is configured as the electronic device, the electronic device includes a light source portion that outputs light to be supplied to the electrooptic module, and a projection optical system that projects light modulated by the electrooptic module.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are described with reference to the drawings. In the following description, as an electronic device to which the inventions is applied, a projection-type display apparatus in which an electrooptic module including a transmission-type electrooptic panel (transmission-type liquid crystal panel) is used as a light valve is described. Further, in the drawings referred in the following description, the scales are made different among layers and members such that the layers and the members are made to have sizes so as to be recognized in the drawings.

First Embodiment
Configuration of Projection-type Display Apparatus (Electronic Device)

Figure 1A:
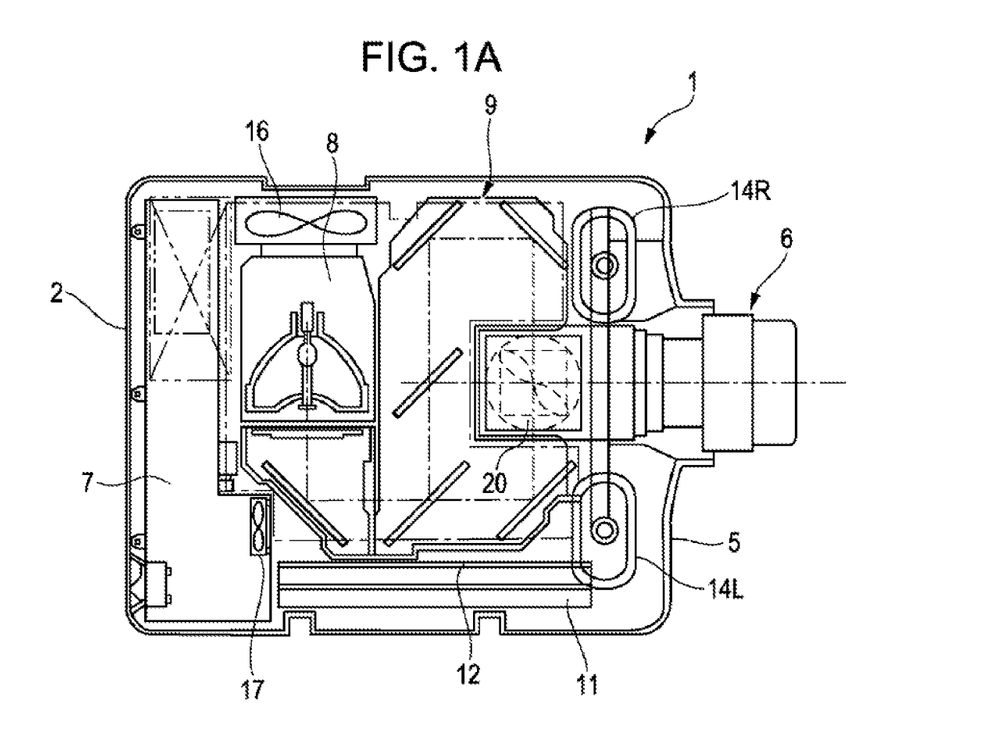
FIGS. 1A and 1B are descriptive views illustrating a projection-type display apparatus as an example of an electronic device to which the invention is applied.
Figure 1B:
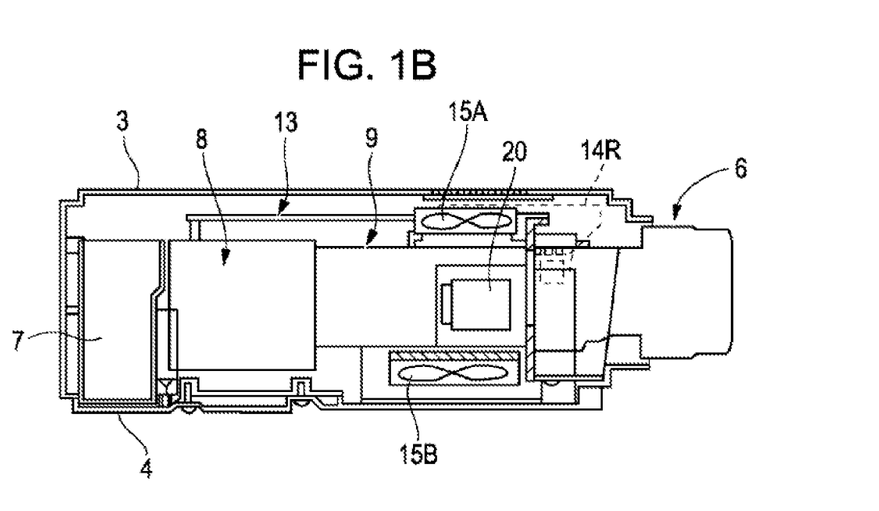
Figure 2:
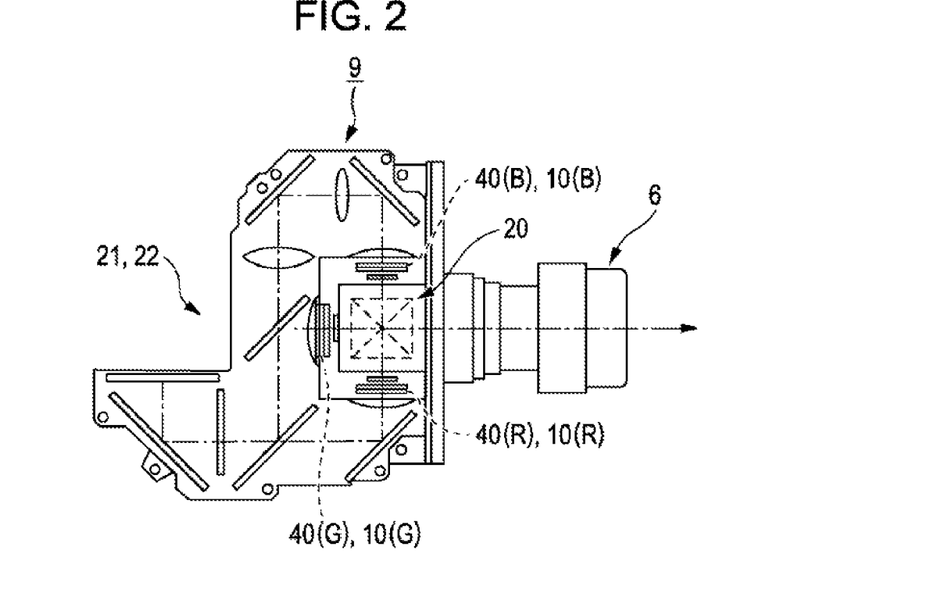
FIG. 2 is a descriptive view illustrating a configuration of an optical unit used for the projection-type display apparatus to which the invention is applied.

FIGS. 1A and 1B are descriptive views illustrating a projection-type display apparatus as an example of an electronic device to which the invention is applied. FIG. 1A is a descriptive view illustrating a planar configuration of a main part of the projection-type display apparatus and FIG. 1B is a descriptive view illustrating the main part of the projection-type display apparatus when seen from the side. FIG. 2 is a descriptive view illustrating a configuration of an optical unit used for the projection-type display apparatus to which the invention is applied.

In an projection-type display apparatus 1 as illustrated in FIGS. 1A and 1B, a power supply unit 7 is arranged in an exterior case 2 at the rear end side and a light source lamp unit 8 (light source portion) and an optical unit 9 are arranged at positions adjacent to the power supply unit 7 at the apparatus front side. Further, the base end side of a projection lens unit 6 is located in the exterior case 2 at the center of the front side of the optical unit 9. An interface substrate 11 on which an input/output interface circuit is mounted is arranged at one side of the optical unit 9 along the apparatus front-rear direction. A video substrate 12 on which a video signal processing circuit is mounted is arranged so as to be parallel with the interface substrate 11. A control substrate 13 for controlling the driving of the apparatus is arranged above the light source lamp unit 8 and the optical unit 9. Speakers 14R and 14L are arranged at right and left corners at the apparatus front end side.

Suction fans 15A and 15B for cooling an inner portion of the apparatus are arranged above and under the optical unit 9. Further, an exhaust fan 16 is arranged on a apparatus-side surface as a rear-surface side of the light source lamp unit 8. In addition, an auxiliary cooling fan 17 for sucking cooling air flow from the suction fan 15A into the power supply unit 7 is arranged at a position facing ends of the interface substrate 11 and the video substrate 12. Among these fans, the suction fan 15B mainly functions as a cooling fan of a liquid crystal panel, which will be described later.

In FIG. 2, optical elements (components) constituting the optical unit 9, which include a prism unit 20 constituting a color light synthesizing unit, are supported by an upper light guide 21 or a lower light guide 22 which are made of metals such as Mg and Al. The upper light guide 21 and the lower light guide 22 are fixed to an upper case 3 and a lower case 4 with fixing screws, respectively.

Detail Configuration of Optical Unit 9

Figure 3:
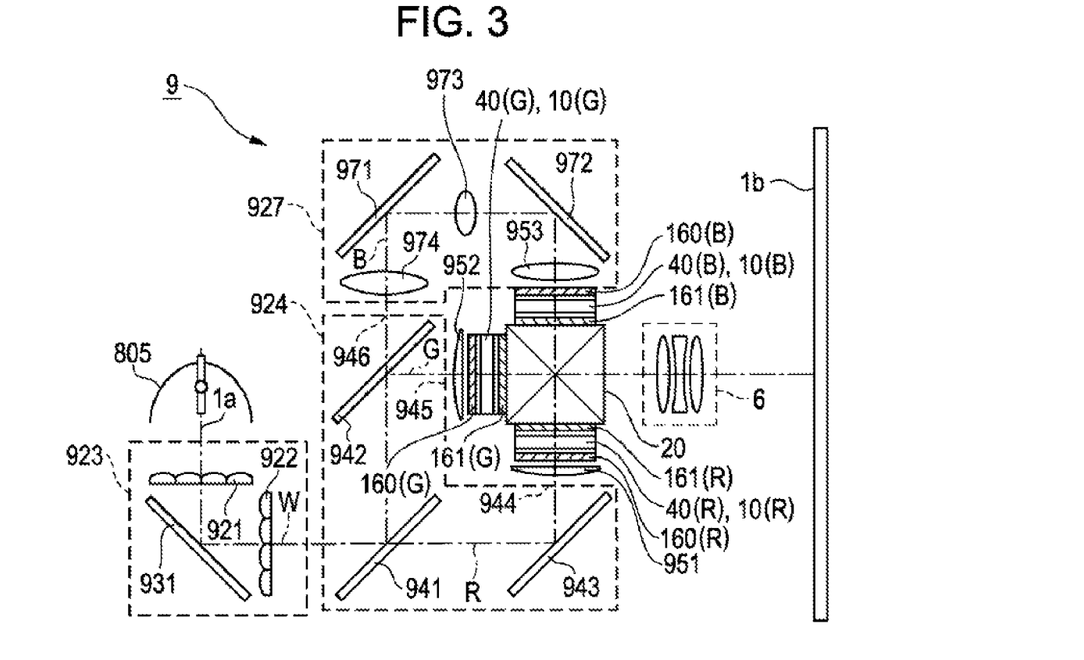
FIG. 3 is a descriptive view illustrating a detail configuration of the optical unit used for the projection-type display apparatus to which the invention is applied.

FIG. 3 is a descriptive view illustrating a detail configuration of the optical unit used for the projection-type display apparatus to which the invention is applied. As illustrated in FIG. 3, the optical unit 9 includes a light source lamp 805, an illumination optical system 923, and a color light separation optical system 924. The illumination optical system 923 has integrator lenses 921 and 922 as uniform illumination optical elements. The color light separation optical system 924 separates a light flux W output from the illumination optical system 923 to light fluxes R, G, and B of red, green, and blue. Further, the optical unit 9 includes three transmission-type electrooptic panels 40(R), 40(G) and 40(B) as electrooptic panels (light valves), a prism unit 20 as a color light synthesis optical system, and the projection lens unit 6. The transmission-type electrooptic panels 40(R), 40(G) and 40(B) modulate the light fluxes of the respective colors. The prism unit 20 synthesizes the modulated color light fluxes. The projection lens unit 6 projects the synthesized light flux onto a projection surface in an enlarged manner. Further, a relay optical system 927 which introduces the blue light flux B among the light fluxes of the respective colors which have been separated by the color light separation optical system 924 to the corresponding electrooptic panel 40(B). The illumination optical system 923 further includes a reflecting mirror 931. An optical axis 1a of the output light from the light source lamp 805 is bent to a right angle toward the apparatus front direction with the reflecting mirror 931. The integrator lenses 921 and 922 are arranged in a state of being orthogonal to each other at the front and rear sides while sandwiching the reflecting mirror 931.

The color light separation optical system 924 is constituted by a blue-green reflecting dichroic mirror 941, a green reflecting dichroic mirror 942, and a reflecting mirror 943. At first, in the light flux W which has passed through the illumination optical system 923, the blue light flux B and the green light flux G contained therein are reflected to a right angle by the blue-green reflecting dichroic mirror 941 and travel toward the side of the green reflecting dichroic mirror 942. The red light flux R which passes through the blue-green reflecting dichroic mirror 941, is reflected to a right angle by the reflecting mirror 943 at the rear side, and is output to the side of the color light synthesis optical system from an output portion 944 for the red light flux. Next, only the green light flux G of the light fluxes B and G of blue and green which have been reflected by the blue-green reflecting dichroic mirror 941 is reflected to a right angle by the green reflecting dichroic mirror 942 and is output to the side of the color light synthesis optical system from an output portion 945 for the green light flux. The blue light flux B which has passed through the green reflecting dichroic mirror 942 is output to the side of the relay optical system 927 from an output portion 946 for the blue light flux. In the embodiment, distances from the output portion of the light flux on the illumination optical system 923 to the output portions 944, 945, and 946 for the light fluxes of the respective colors on the color light separation optical system 924 are set to be substantially equal to one another.

Condenser lenses 951 and 952 are arranged at the output sides of the output portions 944 and 945 for the red light flux and the green light flux on the light separation optical system 924. Accordingly, the red light flux and the green light flux output from the respective output portions are incident on the condenser lenses 951 and 952, respectively, so as to be made parallel with each other.

Polarization directions of the red and green light fluxes R and G which have been made parallel with each other are made uniform by polarizing plates 160(R) and 160(G), respectively. Thereafter, the red and green light fluxes R and G are incident on the electrooptic panels 40(R) and 40(G), respectively, so as to be modulated. Then, pieces of image information corresponding to the respective color light components are added to the red and green light fluxes R and G. That is to say, the electrooptic panels 40(R) and 40(G) are controlled by image signals corresponding to the pieces of image information by a driving unit (not illustrated) in a switching manner. With this, the respective color light components passing through the electrooptic panels 40(R) and 40(G) are modulated. As the driving unit, a known unit can be used as it is.

On the other hand, the polarization direction of the blue light flux B is made uniform by the polarizing plate 160(B) through the relay optical system 927. Thereafter, the blue light flux B is introduced to the corresponding electrooptic panel 40(B) and is modulated in accordance with image information in the same manner. The relay optical system 927 is constituted by a condenser lens 974, an incident-side reflecting mirror 971, an output-side reflecting mirror 972, an intermediate lens 973 arranged between the mirrors, and a condenser lens 953 arranged at the front side of the electrooptic panel 40(B). In terms of lengths of optical paths of the respective color light fluxes, that is, distances from the light source lamp 805 to the respective liquid crystal panels, the optical path of the blue light flux B is the longest. Accordingly, light amount loss of the blue light flux B is the largest. However, the relay optical system 927 is interposed therebetween so that the light amount loss can be suppressed.

The light fluxes of the respective colors, which have passed through the electrooptic panels 40(R), 40(G) and 40(B) and have been modulated, are incident on polarizing plates 161(R), 161(G), and 161(B), respectively. Then, the light components that have transmitted through the polarizing plates 161(R), 161(G), and 161(B) are incident on the prism unit 20 (cross dichroic prism) to be synthesized. A color image synthesized on the prism unit 20 is projected onto a projection target surface 1b such as a screen located at a predetermined position through the projection lens unit 6 including a projection lens system.

Configuration of Electrooptic Panel 40

Figure 4A:
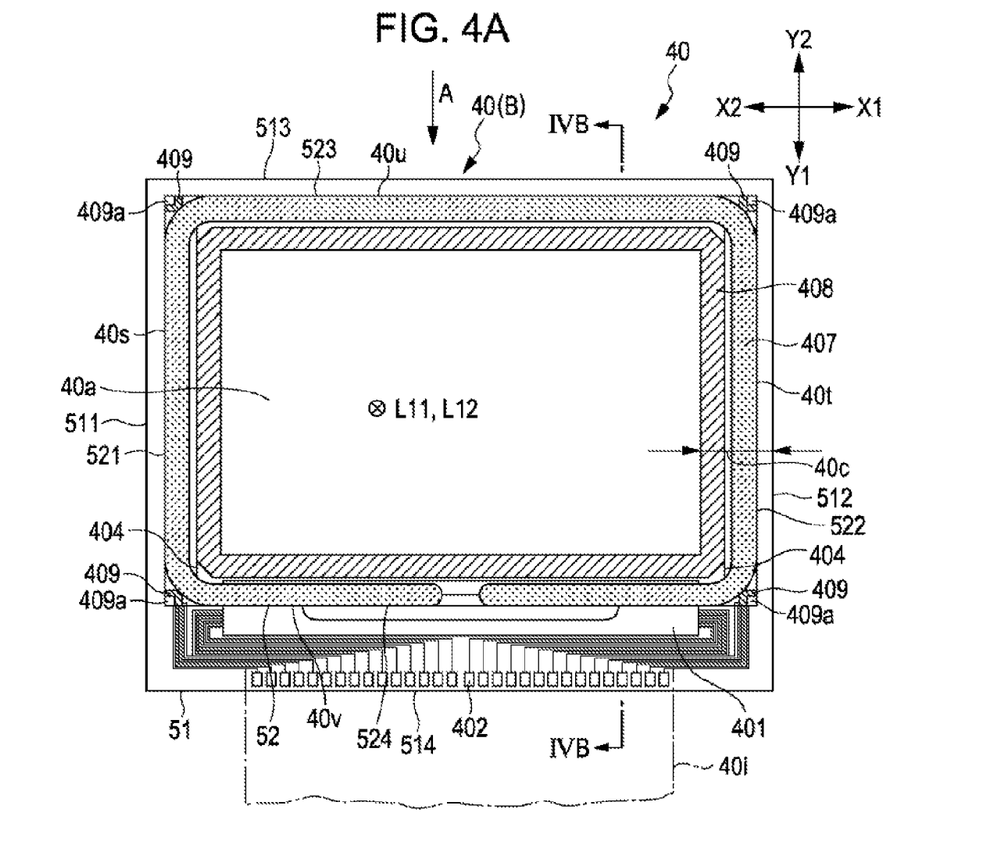
FIGS. 4A and 4B are descriptive views illustrating an electrooptic panel used for an electrooptic module to which the invention is applied.
Figure 4B:
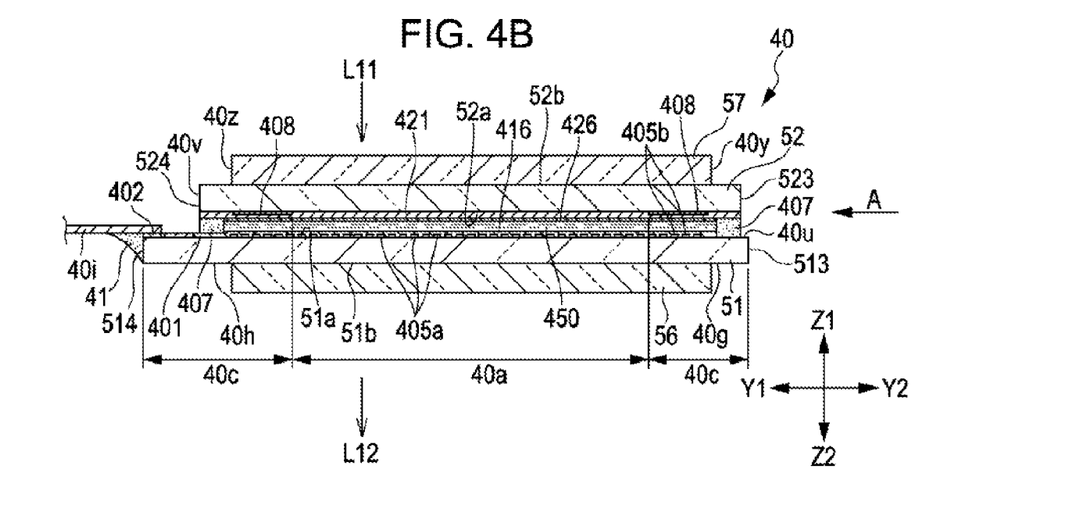

FIGS. 4A and 4B are descriptive views illustrating the electrooptic panel 40 used for the electrooptic module to which the invention is applied. FIG. 4A is a plan view illustrating the electrooptic panel 40 and constituent components thereof when seen from the side of a second substrate (counter substrate) and FIG. 4B is a cross-sectional view thereof cut along a line IVB-IVB in FIG. 4A.

In FIGS. 4A and 4B, and FIG. 5A to FIG. 8B, and the like, which will be described later, a traveling direction of the source light is indicated by an arrow L11, a traveling direction of display light obtained by modulating the source light by the electrooptic panel 40 is indicated by an arrow L12, and flow of cooling air to be supplied to the electrooptic panel 40 by the suction fan 15B and the like as illustrated in FIGS. 1A and 1B is indicated by an arrow A. Further, in the following description, one of two directions intersecting with each other as in-plane directions of the electrooptic panel 40 and the electrooptic module is set to the X-axis direction, the other direction thereof is set to the Y-axis direction, and a direction intersecting with the X-axis direction and the Y-axis direction is set to the Z-axis direction. In the drawings referred below, one side (side at which a flexible printed wiring board 40i is provided) in the X-axis direction is expressed as the X1 side, the other side in the X-axis direction is expressed as the X2 side, one side in the Y-axis direction is expressed as the Y1 side, the other side in the Y-axis direction is expressed as the Y2 side, one side (side on which the source light is incident) in the Z-axis direction is expressed as the Z1 side, and the other side (side from which the display light is output) is expressed as the Z2 side.

In the projection-type display apparatus 1 as described with reference to FIG. 1A to FIG. 3, when the electrooptic panels 40(R), 40(G) and 40(B) are mounted on the optical unit 9, the electrooptic panels 40(R), 40(G) and 40(B) are mounted as electrooptic modules 10(R), 10(G) and 10(B), which will be described later, respectively. The electrooptic panels 40(R), 40(G) and 40(B) have the same configuration. The electrooptic modules 10(R), 10(G) and 10(B) including the electrooptic panels 40(R), 40(G) and 40(B) for red (R), green (G), and blue (B) also have the same configuration. Accordingly, in the following description, for the electrooptic panels 40(R), 40(G) and 40(B), the electrooptic modules 10(R), 10(G) and 10(B), and the like, description is made while (R), (G), and (B) indicating corresponding colors are omitted.

As illustrated in FIGS. 4A and 4B, on the electrooptic panel 40, a translucent first substrate 51 (element substrate) and a translucent second substrate 52 (counter substrate) are bonded to each other with a sealing member 407 through a predetermined space. A silica glass, a heat-resistant glass, or the like is used for the first substrate 51 and the second substrate 52. In the embodiment, the silica glass is used for the first substrate 51 and the second substrate 52. In the embodiment, the electrooptic panel 40 is a liquid crystal panel, and a liquid crystal layer as an electrooptic material layer 450 is held in a region surrounded by the sealing member 407 between the first substrate 51 and the second substrate 52. The sealing member 407 is provided in a frame form along outer edges of the second substrate 52. The sealing member 407 may be a photo-curable adhesive, a heat-curable adhesive, or a photo-curable and heat-curable adhesive. A glass fiber or a gap member such as glass beads for setting a distance between both of the substrates to a predetermined value is blended in the sealing member 407.

In the embodiment, the first substrate 51 has a square shape and includes side end surfaces 511, 512, 513 and 514 on four sides. The second substrate 52 also has a square shape and includes side end surfaces 521, 522, 523 and 524 on four sides in the same manner as the first substrate 51. Therefore, the side end surfaces of the electrooptic panel 40 are constituted by the side end surfaces 511, 512, 513 and 514 of the first substrate 51 and the side end surfaces 521, 522, 523 and 524 of the second substrate 52.

In the embodiment, the first substrate 51 has a size larger than the second substrate 52. The four side end surfaces 511, 512, 513 and 514 of the first substrate 51 are located at the outer sides of the side end surfaces 521, 522, 523 and 524 of the second substrate 52, respectively. Therefore, step portions 40s, 40t, 40u and 40v are formed by the first substrate 51 and the side end surfaces 521, 522, 523 and 524 of the second substrate 52 around the second substrate 52. The first substrate 51 is exposed from the second substrate 52 on the step portions 40s, 40t, 40u and 40v.

On the electrooptic panel 40 having the above-mentioned configuration, the side end surfaces of the electrooptic panel 40 correspond to the side end surfaces 511, 512, 513 and 514 of the first substrate 51. A "first side end surface of the electrooptic panel 40" in the invention corresponds to the "side end surface 511 of the first substrate 51" and a "second side end surface of the electrooptic panel 40" in the invention corresponds to the "side end surface 512 of the first substrate 51".

An image display region 40a which outputs modulated light is provided at substantially the center of the electrooptic panel 40 as a square region. The sealing member 407 is also provided to have a substantially square shape so as to correspond to the shape. Further, a peripheral region 40c having a square frame form is provided between the end portions of the image display region 40a and the side end surfaces of the electrooptic panel 40 (the side end surfaces 511, 512, 513 and 514 of the first substrate 51) on the electrooptic panel 40.

The end portion (end portion at the one side Y1 in the Y-axis direction) of the first substrate 51 at the side at which the side end surface 514 is located largely projects from the side end surface 524 of the second substrate 52 relative to other end portions. A data line driving circuit 401 and a plurality of terminals 402 are formed on the first substrate 51 along the side end surface 514. Further, scanning line driving circuits 404 are formed on the first substrate 51 along the side end surfaces 511 and 512. The flexible printed wiring board 40i is connected to the terminals 402 and various types of potentials and various types of signals are input to the first substrate 51 through the flexible printed wiring board 40*i*. It is to be noted that on the first substrate 51, an adhesive 41 for reinforcement is applied so as to straddle the side end surface 514 and the flexible printed wiring board 40*i*.

On a first surface 51*a* which is opposed to the second substrate 52 in the first surface 51*a* and a second surface 51*b* of the first substrate 51, pixels including translucent pixel electrodes 405*a* and pixel transistors (switching elements (not illustrated)) corresponding to the pixel electrodes 405*a* are formed on the image display region 40*a* in a matrix form. An alignment film 416 is formed at an upper layer side of the pixel electrodes 405*a*. Further, on the first surface 51*a* of the first substrate 51, dummy pixel electrodes 405*b* which are formed simultaneously with the pixel electrodes 405*a* are formed on an inner region relative to the sealing member 407 on the peripheral region 40*c*. As the dummy pixel electrodes 405*b*, a configuration in which the dummy pixel electrodes 405*b* are electrically connected to dummy pixel transistors, a configuration in which the dummy pixel electrodes 405*b* are electrically connected to the wirings directly while the dummy pixel transistors are not provided, or a configuration in which the dummy pixel electrodes 405*b* are in a float state where a potential is not applied thereto is employed.

On a first surface 52*a* which is opposed to the first substrate 51 in the first surface 52*a* and a second surface 52*b* of the second substrate 52, a translucent common electrode 421 is formed. An alignment film 426 is formed on an upper layer of the common electrode 421. The common electrode 421 is formed to cover across a substantially entire surface of the second substrate 52 or a plurality of pixels as a plurality of band-like electrodes. In the embodiment, the common electrode 421 is formed on the substantially entire surface of the second substrate 52. Further, a light shielding layer 408 is formed on the first surface 52*a* of the second substrate 52 at the lower layer side of the common electrode 421. In the embodiment, the light shielding layer 408 is formed in a frame-like form extending along an outer peripheral edge of the image display region 40*a*. The image display region 40*a* is defined with the inner edges of the light shielding layer 408. The outer peripheral edge of the light shielding layer 408 is located at a position spaced from the inner peripheral edge of the sealing member 407. The light shielding layer 408 and the sealing member 407 are not overlapped on each other. Further, a light shielding layer which is formed simultaneously with the light shielding layer 408 may be formed on the second substrate 52 at a region overlapped on regions sandwiched between the adjacent pixel electrodes 405*a* as a black matrix or a black stripe in some cases.

Inter-substrate conducting electrodes 409 are formed on the first substrate 51 at regions overlapped with the corner portions of the second substrate 52 at the outer side relative to the sealing member 407. The inter-substrate conducting electrodes 409 are formed for realizing electrical conduction between the first substrate 51 and the second substrate 52. Inter-substrate conducting members 409*a* containing conductive particles are arranged between the inter-substrate conducting electrodes 409 and the second substrate 52. The common electrode 421 of the second substrate 52 is electrically connected to the first substrate 51 through the inter-substrate conducting members 409*a* and the inter-substrate conducting electrodes 409. Therefore, a common potential is applied to the common electrode 421 from the side of the first substrate 51. The sealing member 407 is provided along the outer peripheral edge of the second substrate 52 with a substantially constant width. However, the sealing member 407 is provided at the inner side on regions overlapped with the corner portions of the second substrate 52 so as to avoid the inter-substrate conducting electrodes 409.

In the embodiment, the pixel electrodes 405*a* and the common electrode 421 are formed by translucent conductive films such as ITO films on the electrooptic panel 40 having the above-mentioned configuration. Therefore, the electrooptic panel 40 is a transmission-type liquid crystal panel. In the case of the transmission-type liquid crystal panel (electrooptic panel 40), light which has been incident from one side of the first substrate 51 or the second substrate 52 is modulated while the light transmits through the other side of the substrates and is output. In the embodiment, the light (indicated by the arrow L11) which has been incident from the second substrate 52 transmits through the first substrate 51 and is output as modulated light (indicated by the arrow L12). Therefore, the second substrate 52 is arranged at one side Z1 (incident side of the source light) in the Z-axis direction, and the first substrate 51 is arranged at the other side Z2 (output side of the display light) in the Z-axis direction. The electrooptic panel 40 in the embodiment is used as a light valve on the above-mentioned projection-type display apparatus (liquid crystal projector) so that a color filter is not formed. However, when the electrooptic panel 40 is used as a direct-view color display apparatus in an electronic device such as a mobile computer and a mobile phone, a color filter is formed on the second substrate 52.

Overall Configuration of Electrooptic Module 10

Figure 5A:
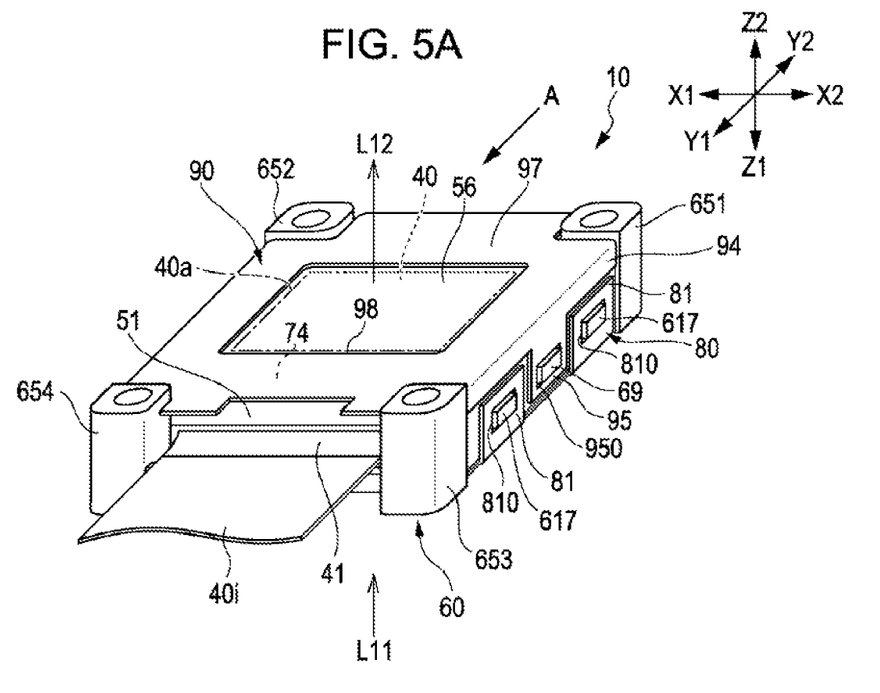
FIGS. 5A and 5B are perspective views illustrating the electrooptic module according to a first embodiment of the invention when seen from a light output side.
Figure 5B:
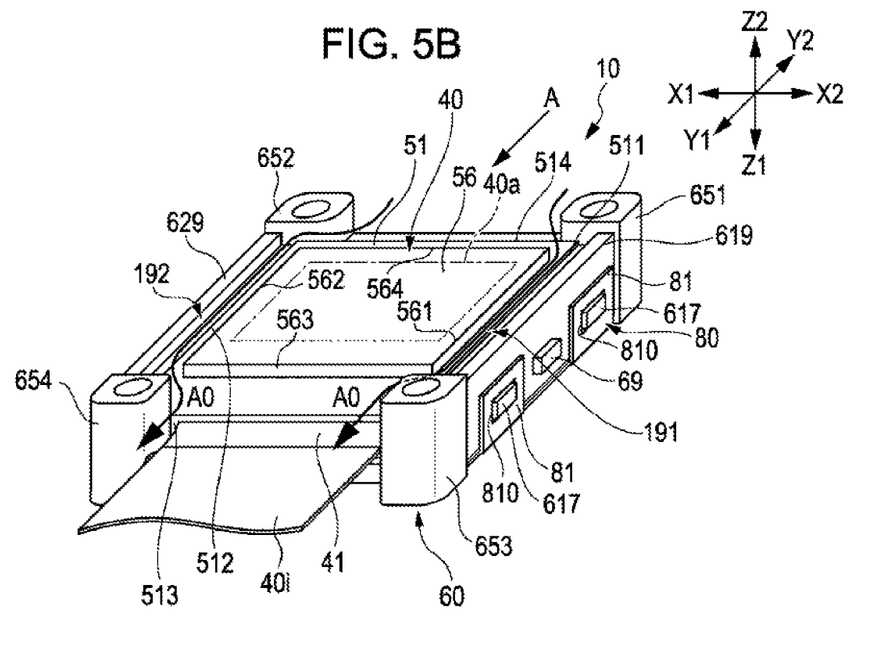
Figure 6A:
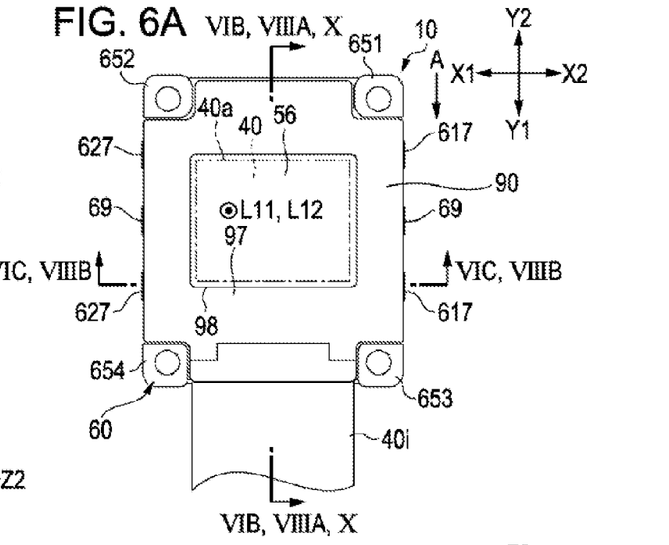
FIGS. 6A to 6D are descriptive views illustrating the electrooptic module as illustrated in FIGS. 5A and 5B.
Figure 6B:
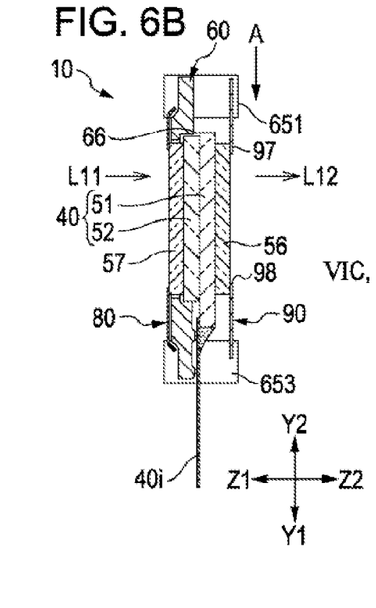
Figure 6C:
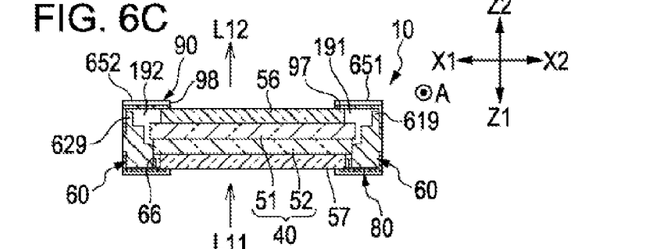
Figure 6D:
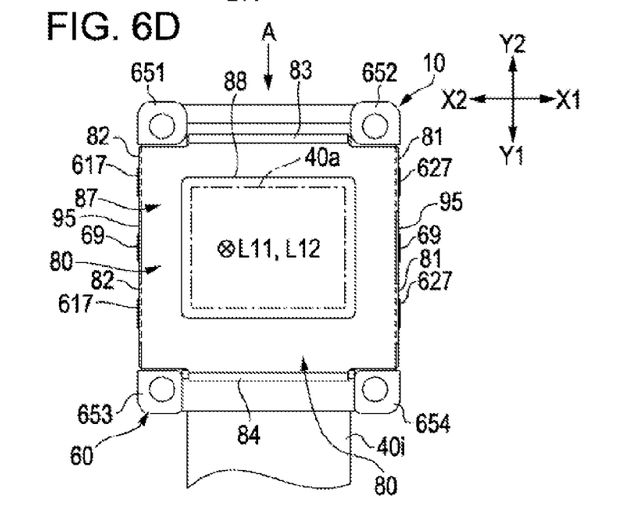
Figure 7:
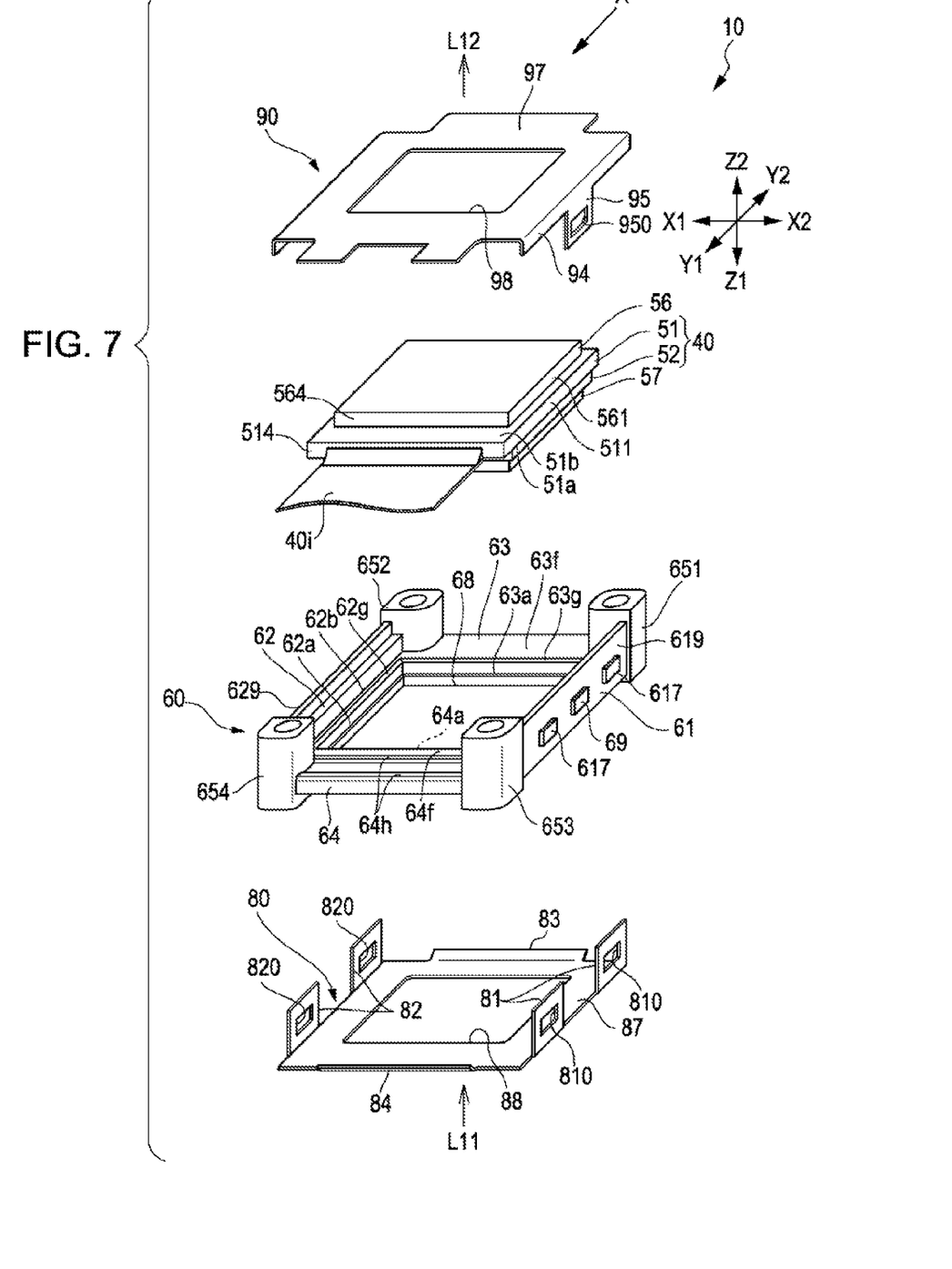
FIG. 7 is an exploded perspective view illustrating a state where the electrooptic module as illustrated in FIGS. 5A and 5B is exploded when seen from the light output side.
Figure 8A:
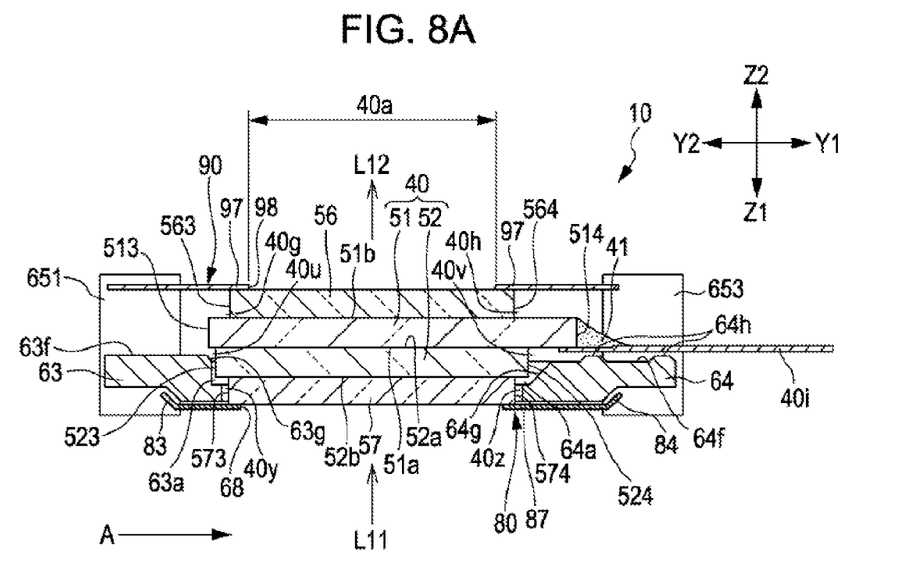
FIGS. 8A and 8B are descriptive views illustrating a cross-sectional configuration of the electrooptic module as illustrated in FIGS. 5A and 5B in an enlarged manner.
Figure 8B:
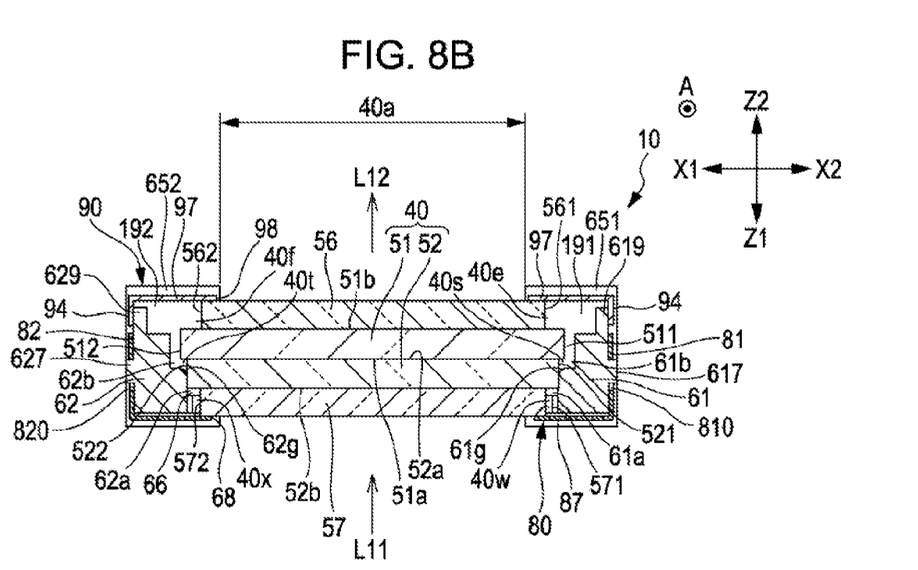

FIGS. 5A and 5B are perspective views illustrating the electrooptic module according to the first embodiment of the invention when seen from the light output side. FIGS. 5A and 5B are a perspective view illustrating the overall electrooptic module and a perspective view illustrating the electrooptic module in a state where the plate-like cover is detached. FIGS. 6A to 6D are descriptive views illustrating the electrooptic module as illustrated in FIGS. 5A and 5B. FIGS. 6A, 6B, 6C and 6D are a plan view illustrating the electrooptic module when seen from the light output side, a cross sectional view cut along a line VIB-VIB, a cross sectional view cut along a line VIC-VIC, and a bottom view when seen from the light incident side. FIG. 7 is an exploded perspective view illustrating a state where the electrooptic module as illustrated in FIGS. 5A and 5B is exploded when seen from the light output side. FIGS. 8A and 8B are descriptive views illustrating a cross-sectional configuration of the electrooptic module as illustrated in FIGS. 5A and 5B in an enlarged manner. FIGS. 8A and 8B are a descriptive view illustrating the cross-sectional view cut along the line VIIIA-VIIIA of FIG. 6A in an enlarged manner and a descriptive view illustrating the cross-sectional view cut along the line VIIIB-VIIIB of FIG. 6A in an enlarged manner.

When the electrooptic panel 40 as described above with reference to FIGS. 4A and 4B is mounted on the projection-type display apparatus 1 and the optical unit 9 as descried above with reference to FIG. 1A to FIG. 3, the electrooptic module 10 in which the electrooptic panel 40 is supported by a frame 60 for reinforcement and the like is configured as illustrated in FIG. 5A to FIG. 8B. Further, on the electrooptic module 10 in the embodiment, a defining member 80 and a plate-like cover 90 are used in addition to the electrooptic panel 40 and the frame 60. Hereinafter, a detail configuration of the electrooptic module 10 is described mainly with reference to FIGS. 8A and 8B.

Configurations of First Translucent Plate 56 and Second Translucent Plate 57

As illustrated in FIGS. 8A and 8B, in the embodiment, when the electrooptic module 10 is configured by using the electrooptic panel 40, the first translucent plate 56 is bonded to the second surface 51b (outer surface/surface of the first substrate 51 at the side opposite to the second substrate 52) of the first substrate 51 with an adhesive or the like. The second translucent plate 57 is bonded to the second surface 52b (outer surface/surface of the second substrate 52 at the side opposite to the first substrate 51) with an adhesive or the like. Each of the first translucent plate 56 and the second translucent plate 57 is configured as a dust-tight glass and prevents dusts and the like from adhering to the outer surface (second surface 51b) of the first substrate 51 and the outer surface (second surface 52b) of the second substrate 52. Therefore, even if the dusts adhere to the electrooptic panel 40, the dusts are separated from the electrooptic material layer 450. Accordingly, the dusts can be suppressed from being portrayed on an image projected from the projection-type display apparatus 1 as described with reference to FIGS. 1A and 1B and the like as images. A silica glass, a heat-resistant glass, or the like is used for the first translucent plate 56 and the second translucent plate 57. In the embodiment, the silica glass is used for the first translucent plate 56 and the second translucent plate 57 like the first substrate 51 and the second substrate 52. The thicknesses of the first translucent plate 56 and the second translucent plate 57 are 1.1 to 1.2 mm.

The first translucent plate 56 is provided so as to be overlapped on at least the image display region 40a of the electrooptic panel 40 in a state where at least a part of the second surface 51b of the first substrate 51 is exposed. To be more specific, the first translucent plate 56 has a square shape having a size smaller than the first substrate 51. End portions 561, 562, 563 and 564 of the first translucent plate 56 are located at the inner sides of the side end surfaces 511, 512, 513 and 514 of the first substrate 51 on the entire circumference of the first translucent plate 56, respectively. The end portions 561, 562, 563 and 564 of the first translucent plate 56 are overlapped between the side end surfaces 511, 512, 513 and 514 of the first substrate 51 and the end portions of the image display region 40a. Therefore, the end portions 561 and 562 which are opposed to each other in the X-axis direction on the first translucent plate 56 are located between the first side end surface (the side end surface 511 of the first substrate 51) of the electrooptic panel 40, which is located at the other side X2 in the X-axis direction, and the image display region 40a, and between the second side end surface (the side end surface 512 of the first substrate 51) of the electrooptic panel 40, which is located at the one side X1 in the X-axis direction, and the image display region 40a, respectively. Accordingly, the end portions of the second surface 51b of the first substrate 51 at the sides at which the side end surfaces 511 and 512 are located are exposed from the first translucent plate 56. Further, the end portions 563 and 564 which are opposed to each other in the Y-axis direction on the first translucent plate 56 are located between the side end surfaces 513 and 514 of the first substrate 51, which constitute a pair of opposed side end surfaces of the electrooptic panel 40 in the Y-axis direction, and the end portions of the image display region 40a. Further, the end portions of the second surface 51b of the first substrate 51 at the sides at which the side end surfaces 513 and 514 are located are also exposed from the first translucent plate 56. Therefore, step portions 40e, 40f, 40g and 40h are constituted by the end portions 561, 562, 563 and 564 of the first translucent plate 56 and the second surface 51b of the first substrate 51 around the first translucent plate 56.

Further, the second translucent plate 57 is provided so as to be overlapped on at least the image display region 40a of the electrooptic panel 40 in a state where at least a part of the second surface 52b of the second substrate 52 is exposed. To be more specific, the second translucent plate 57 has a square shape having a size which is substantially the same as that of the first translucent plate 56 and is smaller than the second substrate 52. Therefore, end portions 571, 572, 573 and 574 of the second translucent plate 57 are located at the inner sides of the side end surfaces 521, 522, 523 and 524 of the second substrate 52 on the entire circumference of the second translucent plate 57, respectively. The end portions 571, 572, 573 and 574 of the second translucent plate 57 are overlapped on regions between the side end surface 521, 522, 523 and 524 of the second translucent plate 57 and the end portions of the image display region 40a. Therefore, step portions 40w, 40x, 40y and 40z are constituted by the end portions 571, 572, 573 and 574 of the second translucent plate 57 and the second surface 52b of the second substrate 52 around the second translucent plate 57.

Configuration of Frame 60

In the embodiment, the frame 60 is a resin member or a metal member having a rectangular frame shape, which includes an opening 68 having a rectangular shape at the center. The frame 60 includes four frame portions 61, 62, 63 and 64 surrounding the electrooptic panel 40. On the four frame portions 61, 62, 63 and 64, coupling portions (corner portions) between the adjacent frame portions correspond to columnar portions 651, 652, 653 and 654 having rectangular cylindrical shapes which project toward the other side Z2 in the Z-axis direction. The columnar portions 651, 652, 653 and 654 correspond to seat portions on which threaded holes for screwing the electrooptic module 10 on the frame or the like of the projection-type display apparatus are formed. The columnar portions 651, 652, 653 and 654 have substantially quadrangular cylindrical shapes. Three corner portions of the four corner portions on the outer circumferential surface of each of the columnar portions 651, 652, 653 and 654 are curved.

The frame 60 is formed by the metal member or the resin member. In the embodiment, the frame 60 is formed by the metal member. If the defining member 80 at the incident side, which will be described later, is attached to the frame 60, a panel accommodating portion 66 is constituted at the inner side of the frame 60. The panel accommodating portion 66 has a bottom portion formed by the defining member 80.

On the frame 60, step portions corresponding to the shapes of the end portions in a state where the second translucent plate 57 is bonded to the electrooptic panel 40 are configured on the inner side surfaces of the frame portions 61, 62, 63 and 64. To be more specific, as illustrated in FIG. 8B, on the side surfaces of the panel accommodating portion 66, step portions 61a and 61b are formed on the inner side surface of the frame portion 61 located at the other side X2 in the X-axis direction. In this case, the step portions 61a and 61b are formed at positions separated from each other in the Z-axis direction. The step portion 61a of the step portions 61a and 61b, which is located at the one side Z1 in the Z-axis direction, is opposed to the step portion 40w on the second translucent plate 57. The end portion 571 of the second translucent plate 57 is separated from the inner side surface of the frame portion 61 with a space. The side end surface 521 of the second substrate 52 is separated from the inner side surface of the frame portion 61 with an extremely narrow space. Further, the step portion 61b located at the other side Z2 in the Z-axis direction is opposed to the step portion 40s on the electrooptic panel 40. The side end surface 511 of the first substrate 51 is separated from the inner side surface of the frame portion 61 with a space. A plate-like protrusion 619 which projects toward the other side Z2 in the Z-axis direction is formed at the outermost side of the frame portion 61. The plate-like protrusion 619 extends entirely between the two columnar portions 651 and 653 opposed to each other in the Y-axis direction.

Step portions 62a and 62b are formed on the inner side surface of the frame portion 62 located at the one side X1 in the X-axis direction in the same manner as the inner side surface of the frame portion 61. The step portion 62a is opposed to the step portion 40x on the electrooptic panel 40. The end portion 572 of the second translucent plate 57 is separated from the inner side surface of the frame portion 62 with a space. The side end surface 522 of the second substrate 52 is separated from the inner side surface of the frame portion 62 with an extremely narrow space. Further, the step portion 62b is opposed to the step portion 40t on the electrooptic panel 40. The side end surface 512 of the first substrate 51 is separated from the inner side surface of the frame portion 62 with a space. A plate-like protrusion 629 which projects toward the other side Z2 in the Z-axis direction is formed at the outermost side of the frame portion 62. The plate-like protrusion 629 extends entirely between the two columnar portions 652 and 654 opposed to each other in the Y-axis direction.

As illustrated in FIG. 8A, a step portion 63a is formed on the inner side surface of the frame portion 63 located at the other side Y2 in the Y-axis direction. The step portion 63a is opposed to the step portion 40y on the electrooptic panel 40. The end portion 573 of the second translucent plate 57 is separated from the inner side surface of the frame portion 63 with a space. The side end surface 523 of the second substrate 52 is separated from the inner side surface of the frame portion 63 with an extremely narrow space. The frame portion 63 at the outer side relative to the step portion 63a corresponds to a plate-like portion 63f extended in the in-plane direction of the electrooptic panel 40. Therefore, the frame 60 is not present at the outer side of the side end surface 513 of the first substrate 51.

A step portion 64a is formed on the inner side surface of the frame portion 64 located at the one side Y1 in the Y-axis direction. The step portion 64a is opposed to the step portion 40z on the electrooptic panel 40. The end portion 574 of the second translucent plate 57 is separated from the inner side surface of the frame portion 64 with a space. The frame portion 64 at the outer side relative to the step portion 64a corresponds to a plate-like portion 64f extended in the in-plane direction of the electrooptic panel 40. A portion between the step portion 64a and the plate-like portion 64f corresponds to a tapered surface 64g. The flexible printed wiring board 40i is drawn out to the outer side of the frame 60 so as to extend along the in-plane direction of the electrooptic panel 40 (in-plane direction of the plate-like portion 64f). Two protrusions 64h are formed on the plate-like portion 64f on a surface located at the side of the flexible printed wiring board 40i. Therefore, displacement of the flexible printed wiring board 40i toward the plate-like portion 64f is limited by the protrusions 64h.

The electrooptic module 10 is manufactured by using the frame 60 having the above-mentioned configuration in the following manner. As illustrated in FIGS. 8A and 8B, the defining member 80 at the incident side, which will be described later, is attached to the frame 60 and the panel accommodating portion 66 is formed at the inner side of the frame 60. Thereafter, the electrooptic panel 40 is accommodated at the inner side of the panel accommodating portion 66. To be more specific, the first translucent plate 56 and the second translucent plate 57 are bonded to the electrooptic panel 40. Thereafter, the electrooptic panel 40 is provided at the inner side (in the panel accommodating portion 66) of the frame 60 from the side (the other side Z2 in the Z-axis direction) of the frame 60 at which the display light is output such that the side of the second translucent plate 57 precedes. In this case, the side end surface 521, 522, 523 and 524 of the second substrate 52 project to the outer side relative to the second translucent plate 57. Then, in the embodiment, a corner portion located between the step portions 61a and 61b on the frame portion 61 is made to a tapered surface 61g which obliquely faces toward the other side Z2 in the Z-axis direction. The end portion of the second substrate 52 is guided to the inner side on the tapered surface 61g. Further, a corner portion located between the step portions 62a and 62b on the frame portion 62 is also made to a tapered surface 62g which obliquely faces toward the other side Z2 in the Z-axis direction. The end portion of the second substrate 52 is guided to the inner side on the tapered surface 62g. In addition, an inner edge on the frame portion 63 is made to a tapered surface 63g which obliquely faces toward the other side Z2 in the Z-axis direction. The end portion of the second substrate 52 is guided to the inner side on the tapered surface 63g. It is to be noted that a corner portion located between the step portion 64a and the plate-like portion 64f on the frame portion 64 is also made to the tapered surface 64g which obliquely faces toward the other side Z2 in the Z-axis direction. The end portion of the second substrate 52 is guided to the inner side on the tapered surface 64g.

Configuration of Defining Member 80 at Incident Side

The plate-like defining member 80 formed by a metal plate or a resin plate is arranged on the frame 60 at the light incident side (one side Z1 in the Z-axis direction) in a stacked manner. In the embodiment, the defining member 80 is made of a metal and the surface of the defining member 80, which faces to the one side Z1 in the Z-axis direction corresponds to a reflecting surface.

The defining member 80 includes a square end plate portion 87 which is overlapped on the frame 60 at the light incident side. An opening 88 which is overlapped on the opening 68 of the frame 60 is formed on the end plate portion 87. The opening 88 is smaller than the opening 68 of the frame 60 and the end plate portion 87 is extended to the inner side of the opening 68 on the entire circumference of the opening 68. Accordingly, the end plate portion 87 of the defining member 80 functions as a defining portion which limits the range in which light is incident on the electrooptic panel 40.

As illustrated in FIGS. 6A to 6D, FIG. 7 and FIGS. 8A and 8B, the defining member 80 includes side plate portions 81, 82, 83 and 84 extending from the outer edges of the end plate portion 87. Among these side plate portions 81, 82, 83 and 84, the side plate portion 83 located at the other side Y2 in the Y-axis direction extends so as to be overlapped on the surface of the frame portion 63 at the one side Z1 in the Z-axis direction and a front end side of the side plate portion 83 is obliquely bent along the shape of the frame portion 63. Further, the side plate portion 84 located at the one side Y1 in the Y-axis direction extends so as to be overlapped on the surface of the frame portion 64 at the one side Z1 in the Z-axis direction and a front end side of the side plate portion 84 is obliquely bent along the shape of the frame portion 64.

The side plate portions 81 located at the other side X2 in the X-axis direction are bent to a substantially right angle from the end portion of the end plate portion 87 toward the other side Z2 in the Z-axis direction so as to be overlapped on the outer side surface of the frame portion 61. In the embodiment, the side plate portions 81 are provided at two places so as to be separated from each other in the Y-axis direction. An engagement hole 810 is formed on each of the two side plate portions 81. On the other hand, protrusions 617 to be fitted into the two engagement holes 810 are formed on the outer side surface of the frame portion 61 of the frame 60. Further, the side plate portions 82 located at the one side X1 in the X-axis direction are bent to a substantially right angle from the end portion of the end plate portion 87 toward the other side Z2 in the Z-axis direction so as to be overlapped on the outer side surface of the frame portion 62. In the embodiment, the side plate portions 82 are provided at two places so as to be separated from each other in the Y-axis direction. An engagement hole 820 is formed on each of the two side plate portions 82. On the other hand, protrusions 627 to be fitted into the two engagement holes 820 are formed on the outer surface of the frame portion 62 of the frame 60. Accordingly, the side plate portions 81 and 82 provided so as to sandwich the frame 60 therebetween are engaged with the protrusions 617 and 627 of the frame 60 so that the defining member 80 is coupled to the frame 60 and is integrated with the frame 60. As a result, the panel accommodating portion 66 of which bottom portion corresponds to the end plate portion 87 of the defining member 80 is configured at the inner side of the frame 60. The electrooptic panel 40 to which the first translucent plate 56 and the second translucent plate 57 are bonded is accommodated in the panel accommodating portion 66.

Further, protrusions 69 are formed on the outer surfaces of the frame portions 61 and 62 of the frame 60 at positions sandwiched between the protrusions 617 and 627. The plate-like cover 90 is engaged with the protrusions 69 when the electrooptic module 10 is assembled.

In the embodiment, the frame-like end plate portion 87 of the defining member 80 is used as a definition at the incident side. However, a light shielding layer may be provided on the second translucent plate 57 at a region overlapped with the end plate portion 87 and the incident side may be defined by the light shielding layer and the defining member 80.

Configuration of Plate-like Cover 90 at Output Side

In the embodiment, the plate-like cover 90 formed by a metal plate or a resin plate is arranged on the first translucent plate 56 at the other side Z2 in the Z-axis direction. In the embodiment, the plate-like cover 90 is formed by the metal plate and the surface of the plate-like cover 90 at the other side Z2 in the Z-axis direction corresponds to a light absorption surface by blacking processing. Therefore, even if light output from the electrooptic panel 40 is reflected by another member toward the electrooptic panel 40, the light can be absorbed by the plate-like cover 90 so as to prevent stray light from being generated.

The plate-like cover 90 includes a frame-like plate portion 97 having a rectangular shape, which is overlapped on the first translucent plate 56 at the other side Z2 in the Z-axis direction. An opening 98 is formed at the center of the frame-like plate portion 97 on a region overlapped with the image display region 40a. The opening 98 is smaller than the first translucent plate 56 so that the frame-like plate portion 97 functions as a defining portion which limits the range in which the display light is output.

Further, the plate-like cover 90 includes a pair of side plate portions 94 which are bent to a substantially right angle from the outer edges of side portions of the frame-like plate portion 97, which are opposed to each other in the X-axis direction. The side plate portions 94 cover the side end surfaces 511 and 512 of the first substrate 51 used for the electrooptic panel 40.

Further, engagement plate portions 95 extend from the one pair of side plate portions 94 toward the side (one side Z1 in the Z-axis direction) at which the frame 60 is located. Engagement holes 950 to which the protrusions 69 formed on the frame 60 are fitted are formed on the pair of engagement plate portions 95. The side plate portions 94 are formed on the plate-like cover 90 entirely in the Y-axis direction. However, the engagement plate portions 95 have dimensions smaller than the side plate portions 94 in the Y-axis direction and extend from the center of the side plate portions 94 in the Y-axis direction toward the frame 60.

Fixing Configuration of Electrooptic Panel 40 and the Like and Configuration of Ventilation Paths The electrooptic module 10 in the embodiment is assembled in the following manner. At first, the defining member 80 at the incident side is attached to the frame 60 so as to form the panel accommodating portion 66 at the inner side of the frame 60. Thereafter, the electrooptic panel 40 to which the first translucent plate 56 and the second translucent plate 57 are bonded is accommodated in the panel accommodating portion 66. Next, the plate-like cover 90 is stacked on the electrooptic panel 40 in this order at the other side Z2 in the Z-axis direction and the protrusions 69 of the frame 60 are engaged with the engagement holes 950 of the engagement plate portions 95. As a result, the plate-like cover 90 and the frame 60 are coupled to each other so that the electrooptic panel 40 is supported by the frame 60, the defining member 80 at the incident side, and the plate-like cover 90 at the output side. In this case, if an adhesive is applied to the inner side of the frame 60, the electrooptic panel 40 can be bonded to and fixed to the frame 60.

In the state where the electrooptic module 10 has been assembled in the above-mentioned manner, a hollow first ventilation path 191 is configured on the electrooptic panel 40 at the side (the other side X2 in the X-axis direction) at which the side end surface 511 of the first substrate 51 is located. A periphery of the first ventilation path 191 is surrounded by the side end surface of the first translucent plate 56 at the side of the end portion 561, the portion on which the electrooptic panel 40 is exposed from the end portion 561 of the first translucent plate 56 at the other side X2 in the X-axis direction, the frame portion 61 of the frame 60, and the frame-like plate portion 97 of the plate-like cover 90. Further, a hollow second ventilation path 192 is configured on the electrooptic panel 40 at the side (the one side X1 in the X-axis direction) at which the side end surface 512 of the first substrate 51 is located. A periphery of the second ventilation path 192 is surrounded by the side end surface of the first translucent plate 56 at the side of the end portion 562, a portion on which the electrooptic panel 40 is exposed from the end portion 562 of the first translucent plate 56 at the one side X1 in the X-axis direction, the frame portion 62 of the frame 60, and the frame-like plate portion 97 of the plate-like cover 90.

The first ventilation path 191 and the second ventilation path 192 extend in the Y-axis direction along the side end surfaces 511 and 512 of the first substrate 51 and are opened at both ends of the electrooptic module 10 in the Y-axis direction. To be more specific, the first ventilation path 191 and the second ventilation path 192 are opened between the columnar portions 653 and 654 at the one side Y1 in the Y-axis direction. Further, the first ventilation path 191 and the second ventilation path 192 are opened between the columnar portions 651 and 652 at the other side Y2 in the Y-axis direction. The first ventilation path 191 and the second ventilation path 192 are opened between the frame-like plate portion 97 of the plate-like cover 90 and the frame 60 at the one side Y1 and the other side Y2 in the Y-axis direction.

Accordingly, as indicated by the arrow A, when flow of cooling air toward the one side Y1 from the other side Y2 in the Y-axis direction is formed for the electrooptic panel 40 by the suction fan 15B and the like as illustrated in FIGS. 1A and 1B, the cooling air passes through between the columnar portions 651 and 652 and flows in the first ventilation path 191 and the second ventilation path 192 in the electrooptic module 10. Thereafter, the cooling air passes through between the columnar portions 653 and 654 and flows out of the first ventilation path 191 and the second ventilation path 192. Therefore, heat generated on the electrooptic panel 40 can be released to the cooling air efficiently.

The columnar portions 653 and 654 are located on extended lines of the first ventilation path 191 and the second ventilation path 192 to the one side Y1 in the Y-axis direction. The three corner portions on the outer circumferential surfaces of the columnar portions 653 and 654 are curved shapes. The sides of the columnar portions 653 and 654 at which the first ventilation path 191 and the second ventilation path 192 are opened correspond to the curved surfaces. Further, the columnar portions 651 and 652 are located on the extended lines of the first ventilation path 191 and the second ventilation path 192 to the other side Y2 in the Y-axis direction. The three corner portions on the outer circumferential surfaces of the columnar portions 651 and 652 are the curved shapes. The sides of the columnar portions 651 and 652 on which the first ventilation path 191 and the second ventilation path 192 are opened correspond to the curved surfaces. Accordingly, even when the columnar portions 651, 652, 653 and 654 are present on the extended lines of the first ventilation path 191 and the second ventilation path 192, the cooling air flows along the curved surfaces of the columnar portions 651, 652, 653 and 654 smoothly. Therefore, the cooling air flows in the first ventilation path 191 and the second ventilation path 192 smoothly and the cooling air flows out of the first ventilation path 191 and the second ventilation path 192 smoothly. Accordingly, the cooling air flows at sufficient flow spread on the first ventilation path 191 and the second ventilation path 192 so that the cooling efficiency is high.

Main Effects of the Embodiment

As described above, in the electrooptic module 10 according to the embodiment, the first translucent plate 56 is provided on the second surface 51b (the surface opposite to the second substrate 52) of the first substrate 51 so as to be overlapped on the image display region 40a. Therefore, dusts do not adhere to the position (first substrate 51) close to the electrooptic material layer 450 (liquid crystal layer). Accordingly, even when an image generated on the electrooptic panel 40 is projected, dusts are not easy to influence on the image.

Further, the end portions 561 and 562 of the first translucent plate 56 are located between the pair of opposed side end surfaces (the side end surfaces 511 and 512 of the first substrate 51) of the electrooptic panel 40 and the image display region 40a. Therefore, the electrooptic panel 40 at which the side end surfaces 511 and 512 of the first substrate 51 are located is exposed from the first translucent plate 56. Further, the plate-like cover 90 which includes the frame-like plate portion 97 overlapped on the surface of the first translucent plate 56 at the side opposite to the electrooptic panel 40 is provided on the electrooptic panel 40 at the other side Z2 in the Z-axis direction. The engagement plate portions 95 of the plate-like cover 90 are engaged with the frame 60 so as to be bonded to the frame 60. In this state, the plate-like cover 90 constitutes the ventilation paths (the first ventilation path 191 and the second ventilation path 192) together with the side end surfaces of the first translucent plate 56, the exposed portions of the electrooptic panel 40 from the end portions 561 and 562 of the first translucent plate 56, and the frame 60. The ventilation paths (the first ventilation path 191 and the second ventilation path 192) extend along the extending directions of the side end surfaces 511 and 512 of the first substrate 51 and are opened at both sides of the extending direction. Therefore, when the cooling air supplied to the electrooptic module 10 makes a flow toward the one side Y1 from the other side Y2 in the Y-axis direction on the electrooptic panel 40 by the suction fan 15B and the like as illustrated in FIGS. 1A and 1B as indicated by the arrow A in FIG. 5B, FIGS. 8A and 8B and the like, the cooling air passes through between the columnar portions 651 and 652 and flows in the first ventilation path 191 and the second ventilation path 192 in the electrooptic module 10 as indicated by arrows A0 in FIG. 5B. Then, the cooling air passes through between the columnar portions 653 and 654 and flows out of the first ventilation path 191 and the second ventilation path 192. Therefore, heat generated on the electrooptic module 10 can be released directly to the cooling air flowing in the first ventilation path 191 and the second ventilation path 192 through the portions exposed from the first translucent plate 56 on the side end surfaces 511 and 512 of the first substrate 51 and the second surface 51b of the first substrate 51.

A part of one surface side of the electrooptic panel 40 is exposed from the first translucent plate 56. The exposed portions also constitute the first ventilation path 191 and the second ventilation path 192. Therefore, the cooling effect by the cooling air passing through the first ventilation path 191 and the second ventilation path 192 is high. Further, when the first ventilation path 191 and the second ventilation path 192 are configured, the size of the first translucent plate 56 is made smaller such that the other side Z2 of the electrooptic panel 40 in the Z-axis direction is exposed partially. In addition, the plate-like cover 90 obtained by processing a plate material into a predetermined shape is used. Therefore, the electrooptic panel 40 can be cooled efficiently with a relatively simple configuration.

Further, the frame-like plate portion 97 of the plate-like cover 90 constitutes the defining portion with respect to the image display region 40a. This arises an advantage that a defining member is not required to be provided separately. In addition, the plate-like cover 90 is made of a metal. Therefore, heat generated on the electrooptic panel 40 can be released through the plate-like cover 90. Accordingly, increase in the temperature of the electrooptic panel 40 can be suppressed to be low.

Moreover, the first translucent plate 56 has a size smaller than the electrooptic panel 40 and the electrooptic panel 40 is exposed on the entire circumference of the first translucent plate 56. Accordingly, an area on which the electrooptic panel 40 is exposed from the first translucent plate 56 is large. Therefore, when the cooling air supplied to the electrooptic module 10 flows in the first ventilation path 191 and the second ventilation path 192, and when the cooling air flows out of the first ventilation path 191 and the second ventilation path 192, the first substrate 51 at the sides at which the side end surfaces 513 and 514 are located (the first ventilation path 191 and the second ventilation path 192 are not formed) is also cooled efficiently with the cooling air.

Further, in the embodiment, on the plate-like cover 90 at the sides at which the engagement plate portions 95 are located (the sides at which the first ventilation path 191 and the second ventilation path 192 are formed), the plate-like protrusions 619 and 629 are formed on the frame 60. The plate-like protrusions 619 and 629 protrude to the other side Z2 in the Z-axis direction and extend along the extending directions of the first ventilation path 191 and the second ventilation path 192. Therefore, even when the engagement plate portions 95 are provided at the sides at which the first ventilation path 191 and the second ventilation path 192 are formed, the first ventilation path 191 and the second ventilation path 192 can be partitioned by the plate-like protrusions 619 and 629 on portions on which the engagement plate portions 95 are not formed. Therefore, even when the engagement plate portions 95 are not provided entirely in the extending directions of the first ventilation path 191 and the second ventilation path 192, the cooling air can be prevented from being leaked from the first ventilation path 191 and the second ventilation path 192. This makes it possible to prevent lowering of the cooling effect due to the leakage of the cooling air.

Further, the element substrate (first substrate 51) of which heat generation due to absorption of the source light is larger in the first substrate 51 and the second substrate 52 is used for configuring the first ventilation path 191 and the second ventilation path 192. Therefore, heat generated on the first substrate 51 can be released efficiently.

In addition, even when expensive silica substrates are used for the first translucent plate 56 and the second translucent plate 57, cost of the parts can be reduced because the sizes of the first translucent plate 56 and the second translucent plate 57 are made smaller.

Second Embodiment

In the above-mentioned first embodiment, the columnar portions 651, 652, 653 and 654 of the frame 60, which have the rectangular cylindrical shapes, are located on the extended lines of the first ventilation path 191 and the second ventilation path 192 in the Y-axis direction. Therefore, the surfaces of the columnar portions 651, 652, 653 and 654 at the sides at which the first ventilation path 191 and the second ventilation path 192 are opened are formed as the curved surfaces. However, the columnar portions 651, 652, 653 and 654 may be also formed into circular cylindrical shapes. In this case, the cooling air flows along the curved surfaces of the columnar portions 651, 652, 653 and 654 smoothly. Therefore, the cooling air flows in the first ventilation path 191 and the second ventilation path 192 smoothly and the cooling air flows out of the first ventilation path 191 and the second ventilation path 192 smoothly.

Third Embodiment

Figure 9:
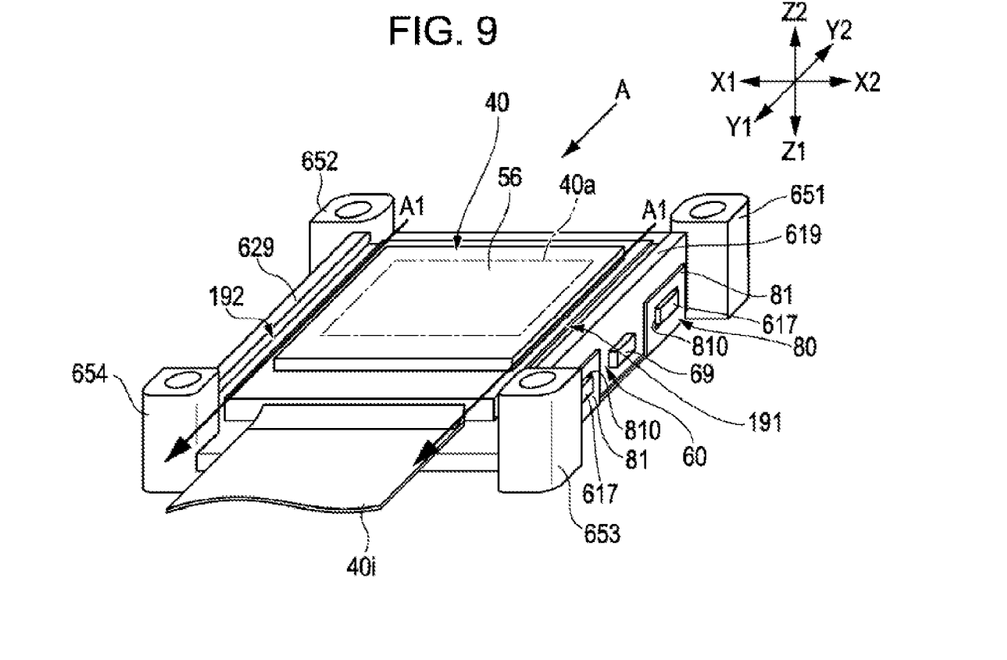
FIG. 9 is a perspective view illustrating a state where a plate-like cover is detached from an electrooptic module according to a third embodiment of the invention.

FIG. 9 is a perspective view in a state where the plate-like cover 90 is detached from the electrooptic module 10 according to a third embodiment of the invention. It is to be noted that since a basic configuration in the embodiment is the same as that in the first embodiment, the same reference numerals are used to common parts and description thereof is omitted.

In the first embodiment, the columnar portions 651, 652, 653 and 654 of the frame 60, which have the rectangular cylindrical shapes, are located on the extended lines of the first ventilation path 191 and the second ventilation path 192 in the Y-axis direction. Therefore, the surfaces of the columnar portions 651, 652, 653 and 654 at the sides at which the first ventilation path 191 and the second ventilation path 192 are opened are formed as the curved surfaces. However, as illustrated in FIG. 9, the columnar portions 651 and 653 may be deviated to the other side X2 in the X-axis direction while the columnar portions 652 and 654 may be deviated to the one side X1 in the X-axis direction and the columnar portions 651, 652, 653 and 654 may be provided at positions deviated from the extended line of the first ventilation path 191 and the extended line of the second ventilation path 192. With this configuration, even when the columnar portions 651, 652, 653 and 654 are provided on the frame 60, the cooling air flows in the first ventilation path 191 and the second ventilation path 192 straightly, and then, flows out of the first ventilation path 191 and the second ventilation path 192 straightly, as indicated by arrows A1. Therefore, when the cooling air flows in the first ventilation path 191 and the second ventilation path 192, and when the cooling air flows out of the first ventilation path 191 and the second ventilation path 192, lowering of the flow speed due to the columnar portion 651, 652, 653 and 654 can be prevented. Accordingly, the cooling efficiency for the electrooptic panel 40 can be enhanced.

Fourth Embodiment

Figure 10:
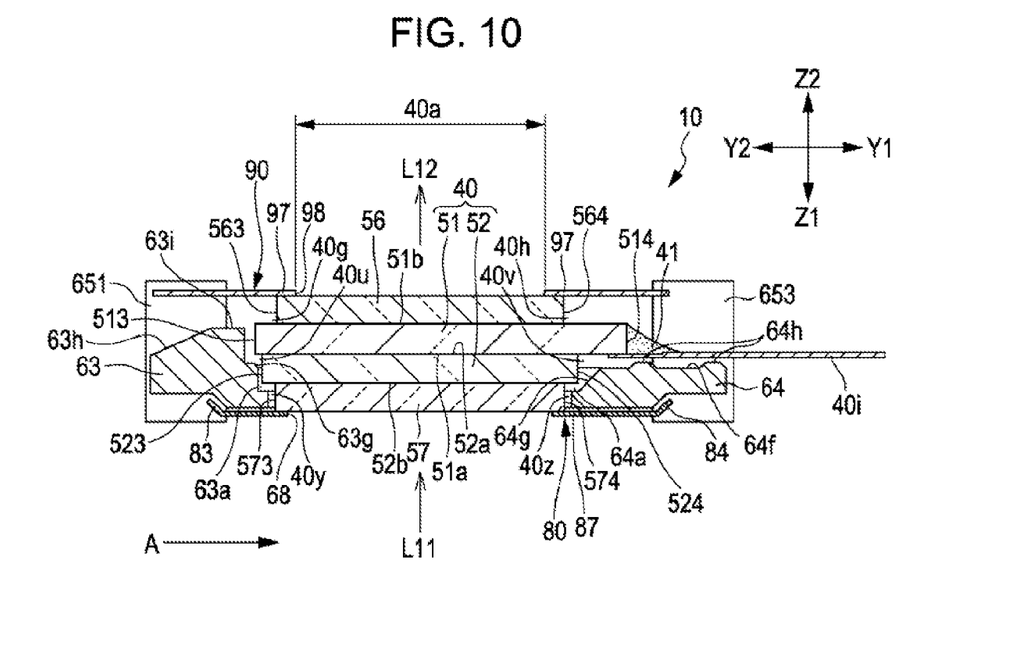
FIG. 10 is a descriptive view illustrating a cross-sectional view of an electrooptic module according to a fourth embodiment of the invention cut along a line X-X in an enlarged manner.

FIG. 10 is a descriptive view illustrating a cross-sectional view of the electrooptic module 10 according to a fourth embodiment of the invention cut along the line X-X in an enlarged manner. It is to be noted that since the basic configuration in the embodiment is the same as that in the first embodiment, the same reference numerals are used to common parts and description thereof is omitted.

In the first embodiment, the frame portion 63 of the frame 60 is formed to be a flat plate. However, as illustrated in FIG. 10, in the embodiment, an upper surface 63i of the frame portion 63 is set to substantially the same height as the second surface 51b of the first substrate 51 and the end portion of the upper surface 63i of the frame portion 63 at the other side Y2 in the Y-axis direction is formed to be a tapered surface 63h. Therefore, when the cooling air as indicated by the arrow A is supplied to the electrooptic module 10, the cooling air is guided to the side of the second surface 51b of the first substrate 51 by the tapered surface 63h so as to be efficiently introduced to the first ventilation path 191 and the second ventilation path 192 as described in the first embodiment and the like. Accordingly, the flow speed of the cooling air on the first ventilation path 191 and the second ventilation path 192 can be made higher, thereby cooling the electrooptic panel 40 efficiently.

Other Embodiments of Electrooptic Module

In the above-mentioned embodiment, the second substrate 52 is provided on the electrooptic panel 40 at the light incident side, and the first substrate 51 is provided at the light output side. However, the invention may be applied to an electrooptic module 10 in which the second substrate 52 is provided at the light output side and the first substrate 51 is provided at the light incident side.

In the above-mentioned embodiment, on the electrooptic panel 40, the second substrate 52 is the counter substrate and the first substrate 51 is the element substrate. However, the invention may be applied to a case where the second substrate 52 is an element substrate and the first substrate 51 is a counter substrate.

In the above-mentioned embodiment, the electrooptic module 10 including the transmission-type electrooptic panel 40 has been described. However, the invention may be applied to an electrooptic module 10 including a reflection-type electrooptic panel 40. In this case, the first substrate 51 is the counter substrate, the second substrate 52 is the element substrate, and the pixel electrodes are formed by a reflective metal film such as aluminum.

In the above-mentioned embodiment, a front surface projection-type display apparatus which projects from a direction in which a projected image is observed has been described as the projection-type display apparatus. However, the invention may be applied to a projection-type display apparatus used for a rear surface projection-type display apparatus which projects an image from the opposite side to the direction in which the projected image is observed.

In the above-mentioned embodiment, the liquid crystal panel has been described as an electrooptic panel, as an example. However, the invention is not limited thereto and the invention may be applied to an electrooptic module using an organic electroluminescent display panel, a plasma display panel, a field emission display (FED) panel, a surface-conduction electron-emitter display (SED) panel, a light emitting diode (LED) display panel, or an electrophoretic display panel, or the like.

Other Electronic Device

The electrophoretic module to which the invention is applied may be used as a direct-view-type display apparatus in electronic devices such as a mobile phone, a personal digital assistants (PDA), a digital camera, a liquid crystal television, a car navigation system, a video phone, a POS terminal, and an apparatus including a touch panel.

This application claims priority from Japanese Patent Application No. 2011-245221 filed in the Japanese Patent Office on Nov. 9, 2011, the entire disclosure of which is hereby incorporated by reference in its entirely.

What is claimed is:

1. An electrooptic module comprising:
an electrooptic panel that includes an image display region;
a frame that supports the electrooptic panel at one surface side of the electrooptic panel;
a translucent plate that is overlapped on the image display region at other surface side of the electrooptic panel and has an end portion located between a first side end surface of the electrooptic panel and the image display region when seen from the above; and
a cover that includes a plate portion which is not overlapped on the image display region and is overlapped on a surface of the translucent plate at a side opposite to the electrooptic panel, and a pair of engagement portions which extend toward the frame from a side of the plate portion and are engaged with the frame,
wherein the cover partitioning a first ventilation path which extends along an extending direction of the first side end surface and is opened at both sides of the extending direction with a side end surface of the translucent plate, a portion on which the electrooptic panel is exposed from the translucent plate at a side of the first side end surface, and the frame.

2. The electrooptic module according to claim 1,
wherein an end portion of the translucent plate is located between a second side end surface of the electrooptic panel, which is opposed to the first side end surface when seen from the above, and the image display region, and
the cover partitions a second ventilation path which extends along an extending direction of the second side end surface and is opened at both sides of the extending direction together with a side end surface of the translucent plate, a portion on which the electrooptic panel is exposed from the translucent plate at a side of the second side end surface, and the frame.

3. The electrooptic module according to claim 2,
wherein the plate portion constitutes a defining portion with respect to the image display region.

4. The electrooptic module according to claim 2,
wherein the cover is made of a metal.

5. The electrooptic module according to claim 2,
wherein the translucent plate has a size smaller than the electrooptic panel, and
the end portion of the translucent plate is arranged between the electrooptic panel and the image display region on the entire circumference of the translucent plate when seen from the above.

6. The electrooptic module according to claim 2,
wherein the pair of engagement portions are provided at the side at which the first side end surface and the second side end surface are located, and
the frame includes plate-like protrusions which protrude to the other surface side and extend in the extending directions at the sides at which the pair of engagement portions are located.

7. The electrooptic module according to claim 2,
wherein the frame includes columnar portions having rectangular cylindrical shapes of which corner portions at the sides at which the first ventilation path and the second ventilation path are opened are curved surfaces or columnar portions having circular cylindrical shapes on an extended line of the first ventilation path and on an extended line of the second ventilation path.

8. The electrooptic module according to claim 2,
wherein the frame includes columnar portions which are located at positions deviated from an extended line of the first ventilation path and an extended line of the second ventilation path.

9. An electronic device comprising:
the electrooptic module according to claim 1;
a light source portion that outputs light to be supplied to the electrooptic module, and
a projection optical system that projects light modulated by the electrooptic module.

* * * * *